J. VOEGTLIN.
METALLIC EGG AND CHICKEN CRATE.
APPLICATION FILED FEB. 7, 1917.
1,297,756.
Patented Mar. 18, 1919.
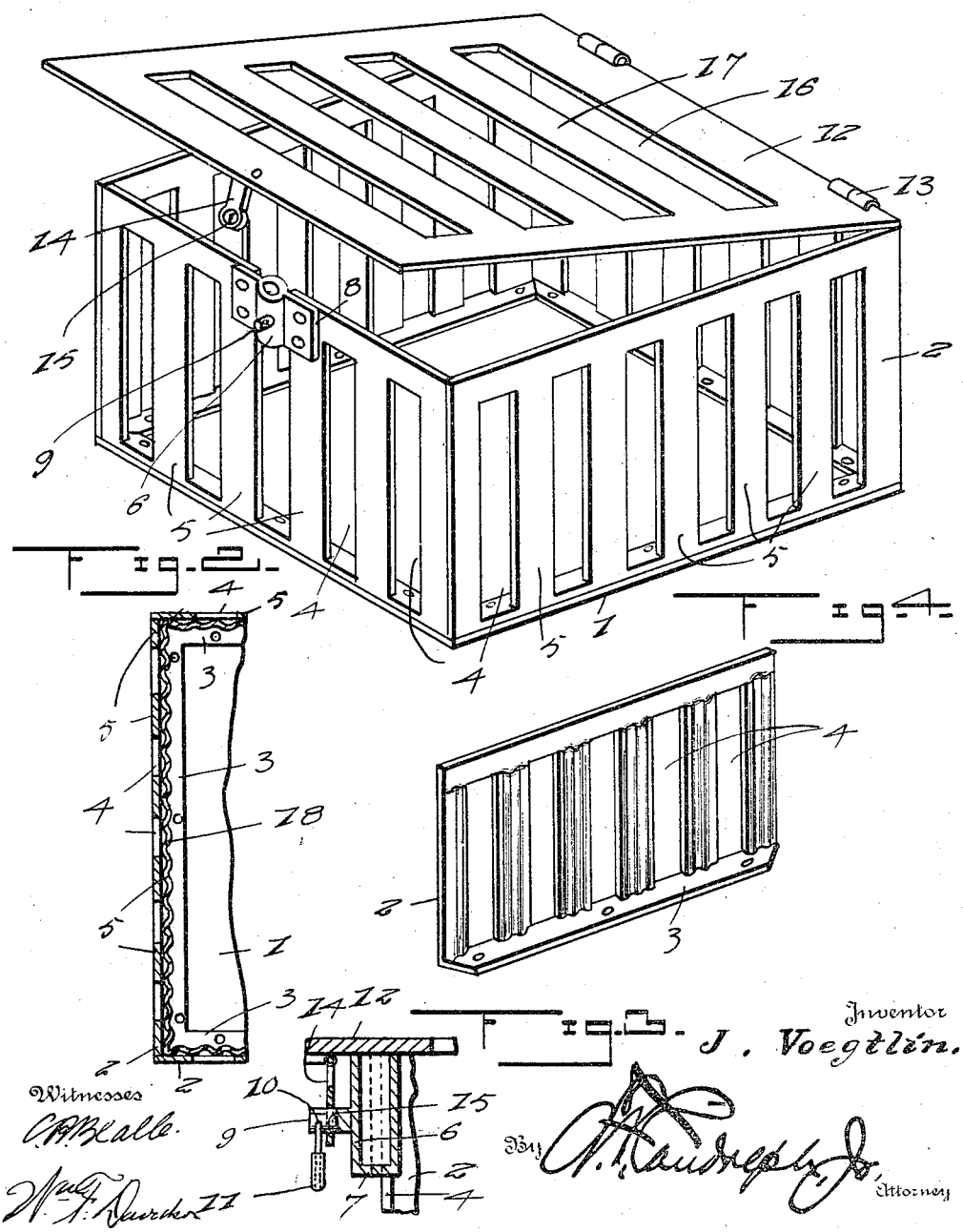
Inventor
J. Voegtlin

UNITED STATES PATENT OFFICE.

JOHN VOEGTLIN, OF FORT WAYNE, INDIANA.

METALLIC EGG AND CHICKEN CRATE.

1,297,756.  Specification of Letters Patent.  Patented Mar. 18, 1919.

Application filed February 7, 1917. Serial No. 147,096.

*To all whom it may concern:*

Be it known that I, JOHN VOEGTLIN, a citizen of the United States, residing at Fort Wayne, in the county of Allen and State of Indiana, have invented certain new and useful Improvements in Metallic Egg and Chicken Crates; and I do hereby declare the following to be a full, clear, and exact description of the invention, such as will enable others skilled in the art to which it appertains to make and use the same.

This invention relates to a metallic egg crate and has for one of its objects the provision of a device of this character, whereby a plurality of cartons containing eggs or chickens may be placed therein for shipment.

Another object of this invention is the provision of means for sealing the crate when eggs have been placed therein, whereby the crate cannot be opened to remove the eggs or chickens without detection.

A further object of this invention is the provision of means located upon the crate and operable with the sealing means for receiving written matter pertaining to the eggs or chickens, such as the date on which the eggs or chickens were placed in the crate or when handled and the bill of the same and which matter cannot be removed from the aforementioned means until the sealing means is broken.

A still further object of this invention is the provision of a metallic egg or chicken crate, which shall be simple, durable and efficient, and which may be manufactured and sold at a comparatively low cost.

With these and other objects in view as will become more apparent as the description proceeds, the invention consists of certain novel features of construction, combination and arrangement of parts as will be hereinafter more fully described and claimed.

For a complete understanding of my invention, reference is to be had to the following description and accompaying drawing, in which:—

Figure 1 is a perspective view of an egg or chicken crate constructed in accordance with my invention.

Fig. 2 is a detail sectional view, illustrating the corrugated paper adapted for location within the crate, Fig. 3 is a detail sectional view of the sealing means, and Fig. 4 is a perspective view of a modified form of my invention, illustrating one of the walls of the crate.

Referring in detail to the drawing, the numeral 1 indicates the bottom of a crate, which is substantially rectangular and has secured thereto by suitable fasteners, sides, front and rear walls 2, each of which have their lower edges bent at right angles to form attaching flanges 3, which are secured to the bottom. The walls 2 are each provided with a plurality of vertical slots or openings 4, which terminate adjacent the upper and lower edges for the purpose of forming slats 5, which slats will add resiliency to the walls of the crate. One of the slots 4 which is formed within the front wall opens outwardly through the upper edge for receiving therein a substantially cylindrical receptacle 6, which has its lower end closed by a wall 7. Oppositely disposed flanges 8 are formed upon the receptacle 6 and are bolted or otherwise secured to the adjacent slats 5 to the respective slot 4 of the front wall as illustrated in Fig. 1. The upper end of the receptacle 6 is opened for the purpose of receiving written matter of various natures pertaining to the contents of the crate. Formed upon the front of the receptacle 6 is a pin 9 having an aperture 10 for receiving an ordinary seal 11.

A cover 12 is secured to the rear wall by hinges 13 and is of sufficient length to project beyond the front wall for closing the upper or open end of the receptacle 6. A hasp 14 is secured to the cover 12 and has an aperture 15 for receiving the pin 9 prior to inserting the seal within the aperture 10. The cover 12 is provided with elongated slots 16 similar to the slots 4 for forming slats 17, which are similar to the slats 5, thus adding resiliency to the cover.

In operation, corrugated paper 18 illustrated in Fig. 2 is placed against the walls 2 of the crate and a plurality of cartons containing eggs or the like is placed within the crate. All written matter pertaining to the eggs, such as the date on which the eggs or chickens were handled or placed within the crate and the bill of lading is placed within the receptacle 6 and the cover 12 is then moved to a closed position which will overlie the receptacle and prevent the written matter from becoming lost therefrom. The hasp 14 is then inserted upon the pin 9 and the seal 11 inserted through the aperture of the pin, whereby the crate is prevented from being opened without detection. When applying the seal 11, the date on which the eggs or the like are placed within the crate may be stamped upon the seal by a suitable tool.

Referring to my modified form of invention as disclosed in Fig. 4, it consists of the walls 2 of the crate having the usual slots 4 forming the slats 18, which are corrugated as clearly illustrated in Fig. 4, for the purpose of adding strength and resiliency to the walls of the crate. While I have shown and described the preferred embodiment of my invention, it will be understood that minor changes in construction, combination and arrangement of parts may be made without departing from the spirit and scope of the invention as claimed.

What is claimed is:

A device of the character set forth including a crate having a hinge cover, a cylindrical receptacle having its lower end closed and its upper end open, laterally projecting flanges formed on said receptacle and secured to the crate to position the open upper end of receptacle at the upper edge of the crate, a pin formed on the receptacle and projcting laterally thereof, and a hasp secured to the cover and receiving the pin for securing the cover to the crate so as to close the upper end of the receptacle by said cover.

In testimony whereof I affix my signature in presence of two witnesses.

JOHN VOEGTLIN.

Witnesses:
   THOMAS J. LOGAN,
   JOHN J. BEUGNAT.

Copies of this patent may be obtained for five cents each, by addressing the "Commissioner of Patents, Washington, D. C."